US 8,103,240 B2

(12) United States Patent
Matsumoto et al.

(10) Patent No.: US 8,103,240 B2
(45) Date of Patent: Jan. 24, 2012

(54) COMMUNICATION SYSTEM AND MOBILE WIRELESS COMMUNICATION DEVICE

(75) Inventors: Fumiaki Matsumoto, Higashiosaka (JP); Toru Hayashi, Kobe (JP)

(73) Assignee: Kyocera Corporation, Kyoto (JP)

( * ) Notice: Subject to any disclaimer, the term of this patent is extended or adjusted under 35 U.S.C. 154(b) by 903 days.

(21) Appl. No.: 11/729,976

(22) Filed: Mar. 30, 2007

(65) Prior Publication Data

US 2007/0232258 A1 Oct. 4, 2007

(30) Foreign Application Priority Data

Mar. 30, 2006 (JP) .................................. 2006-094184

(51) Int. Cl.
*H04M 11/04* (2006.01)
(52) U.S. Cl. ...................... 455/404.1; 455/411; 370/352
(58) Field of Classification Search .................. 370/352, 370/356, 389, 401; 455/404, 456, 521, 411; 379/45, 37
See application file for complete search history.

(56) References Cited

U.S. PATENT DOCUMENTS

| | | | | |
|---|---|---|---|---|
| 7,489,687 | B2 * | 2/2009 | Chavez et al. | 370/392 |
| 7,613,171 | B2 * | 11/2009 | Zehavi et al. | 370/352 |
| 2003/0012159 | A1 * | 1/2003 | Vassilovski et al. | 370/335 |
| 2004/0028034 | A1 * | 2/2004 | Greis | 370/352 |
| 2006/0187952 | A1 * | 8/2006 | Kappes et al. | 370/445 |
| 2007/0121642 | A1 * | 5/2007 | Battin et al. | 370/395.2 |
| 2007/0123208 | A1 * | 5/2007 | Batta et al. | 455/404.1 |
| 2007/0220038 | A1 * | 9/2007 | Crago | 707/102 |
| 2009/0196284 | A1 * | 8/2009 | Beinroth | 370/352 |

FOREIGN PATENT DOCUMENTS

| | | |
|---|---|---|
| JP | 5-167532 | 7/1993 |
| JP | 9-084125 | 3/1997 |
| JP | 2002-262345 | 9/2002 |
| JP | 2002-320263 | 10/2002 |
| JP | 2003-198757 | 7/2003 |

OTHER PUBLICATIONS

Office Action from Japanese Patent Application No. 2006-094184, mailed on Oct. 26, 2010.

* cited by examiner

*Primary Examiner* — Nick Corsaro
*Assistant Examiner* — Mahendra Patel
(74) *Attorney, Agent, or Firm* — Morrison & Foerster LLP

(57) ABSTRACT

A communication system of the present invention includes a mobile phone 100 and an access point. The mobile phone 100 comprises an input receiving unit 110 operable to receive a predetermined emergency phone number, and a control unit 160 operable to, if the input receiving unit 110 receives the predetermined emergency number, select one of access points which can be recognized by signals obtained by a wireless communicating unit 150 from the access points around the mobile phone 100, and cause the wireless communicating unit 150 to transmit an emergency connection request including a call destination phone number to the selected access point. The access point comprises a wireless communicating unit 220 operable to receive the emergency connection request from the mobile phone 100, and a control unit 240 operable to, if the wireless communicating unit 220 receives the emergency connection request, connect the mobile phone 100 to an IP network via an IP network communicating unit 230, without performing authentication of the mobile phone 100.

6 Claims, 5 Drawing Sheets

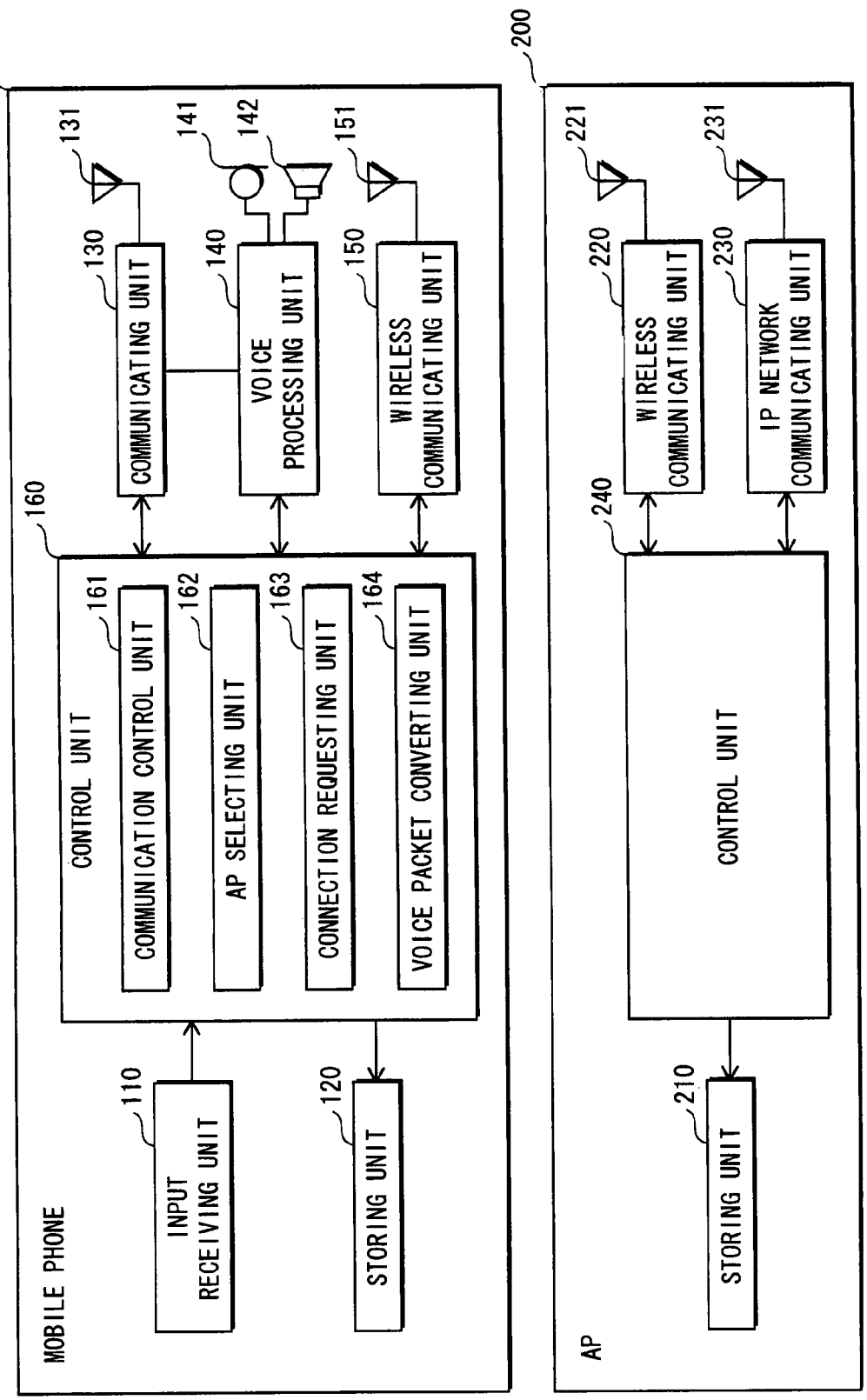

FIG. 2A

| | | |
|---|---|---|
| 510 | EMERGENCY FLAG | 1 |
| 520 | SSID | AAAA |
| 530 | CALL DESTINATION PHONE NUMBER | 911 |
| 540 | SPECIFIC PHONE NUMBER | 050-xxxx-xxxx |

| MAC ADDRESS (610) | IP ADDRESS (620) | SPECIFIC PHONE NUMBER (630) |
|---|---|---|
| 00-00-00-S2-00-02 | xxx.xxx.x.11 | 050-xxxx-1111 |
| 00-00-00-T1-00-01 | xxx.xxx.x.12 | 050-xxxx-1112 |
| ⋮ | ⋮ | ⋮ |

| EMERGENCY FLAG (710) | CONNECTION DESTINATION (720) |
|---|---|
| 1 | GATEWAY (A) |
| 0 | CALL CONTROL SERVER |

700

COMMUNICATION SYSTEM AND MOBILE WIRELESS COMMUNICATION DEVICE

BACKGROUND OF THE INVENTION (1) Field of the Invention

The present invention relates to a communication system and a mobile wireless communication device which can communicate on a VoIP (Voice over IP) network, such as a mobile phone and the like, and especially to a technology for making an emergency call.

(2) Related Art

A conventional technology for making an emergency call by a telephone communication on the VoIP network (hereinafter, referred to as a "VoIP communication") is disclosed in Japanese Published Patent Application No. 2003-198757.

The technology disclosed in Japanese Published Patent Application No. 2003-198757 is as follows. When a user makes an emergency call from an IP phone terminal via the VoIP network, an IP packet including location information of the user and a phone number of an emergency call destination, such as a police station, a fire station, and the like is sent to the VoIP network. Then, a connection with an emergency call facility in a predetermined area corresponding to the location information is established to start a conversation. This technology takes account of an immediacy problem in an emergency that the emergency call may not be able to be made to an emergency call facility in an appropriate area by the VoIP communication, because the phone number of the emergency call destination does not include information specifying an area.

There are two types of VoIP communications. One is transmission/reception of a voice packet on the Internet, and the other is transmission/reception of a voice packet on an IP network that is exclusively established by a communication carrier. In recent years, the number of users of the VoIP communication by the IP network offered by the communication carrier increases because the VoIP communication by the IP network has an advantage of a lower communication expense. If a user contracts with the communication carrier, the user can start a conversation by connecting to the IP network of the communication carrier. Also, not only a fixed-line phone which can perform the VoIP communication, but also a mobile terminal such as a mobile phone which can perform the VoIP communication has been proposed. By wirelessly connecting to an access point of the communication carrier to which the user contracts, the user can connect to the IP network of the communication carrier and start a conversation from outside the home.

However, when the user tries to make an emergency call using the mobile phone and the like from outside the home, there may be cases that the access point of the communication carrier to which the user contracts does not exist around the location of the user, or even if the access point exists, it is difficult to start a conversation due to a low radio field strength. In such cases, the user cannot make the emergency call.

SUMMARY OF THE INVENTION

A communication system of the present invention includes an access point and a mobile wireless communication device, the access point authenticating, in response to a connection request from the mobile wireless communication device, the mobile wireless communication device based on registration information indicating each mobile wireless communication device connectable to a VoIP network, and establishing a connection to the VoIP network if the mobile wireless communication device is authenticated as authorized, the mobile wireless communication device comprising: a number receiving unit operable to receive an input of a phone number; a judging unit operable to judge whether the received phone number is a predetermined emergency number; and a connection requesting unit operable to, if the received phone number is judged to be the predetermined emergency number, select one access point from one or more access points, and send an emergency connection request indicating an emergency call to the selected access point, the one or more access points each being recognized as a connection target by the mobile wireless communication device, and each of the one or more access points comprising: a connection request receiving unit operable to receive the connection request from the mobile wireless communication device; and a connecting unit operable to, if the connection request received by the connection request receiving unit is the emergency connection request, establish the connection to the VoIP network without performing the authentication.

Also, an access point for authenticating, in response to a connection request from a mobile wireless communication device, the mobile wireless communication device based on registration information indicating each mobile wireless communication device connectable to a VoIP network, and establishing a connection to the VoIP network if the mobile wireless communication device is authenticated as authorized, the access point comprising: a connection request receiving unit operable to receive the connection request including a call destination phone number and information which indicates whether an emergency call is requested, from the mobile wireless communication device; and a connecting unit operable to, if the information in the connection request indicates that the emergency call is requested, establish the connection to the VoIP network without performing the authentication.

Moreover, a mobile wireless communication device for connecting to a VoIP network via an access point to perform communication, the mobile wireless communication device comprising: a number receiving unit operable to receive an input of a phone number; a judging unit operable to judge whether the received phone number is a predetermined emergency number; a selecting unit operable to, if the received phone number is judged to be the predetermined emergency number, detect one or more connectable access points, and select one access point from the detected access points; and a connection requesting unit operable to send an emergency connection request indicating an emergency call to the selected access point.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 1 shows a function structure of a communication system of an embodiment of the present invention;

FIG. 2A is a structure example of connection request data transmitted to an access point from a mobile phone of the embodiment;

FIG. 2B is a structure example of a registration information table stored in a call control server of the embodiment;

FIG. 2C is a structure example of a connection information table stored in an access point AP (A) 200 of the embodiment;

DESCRIPTION OF THE PREFERRED EMBODIMENT

Embodiment

The following describes a mobile phone of an embodiment of the present invention, with reference to the attached drawings.

<Outline>

Figure 5:
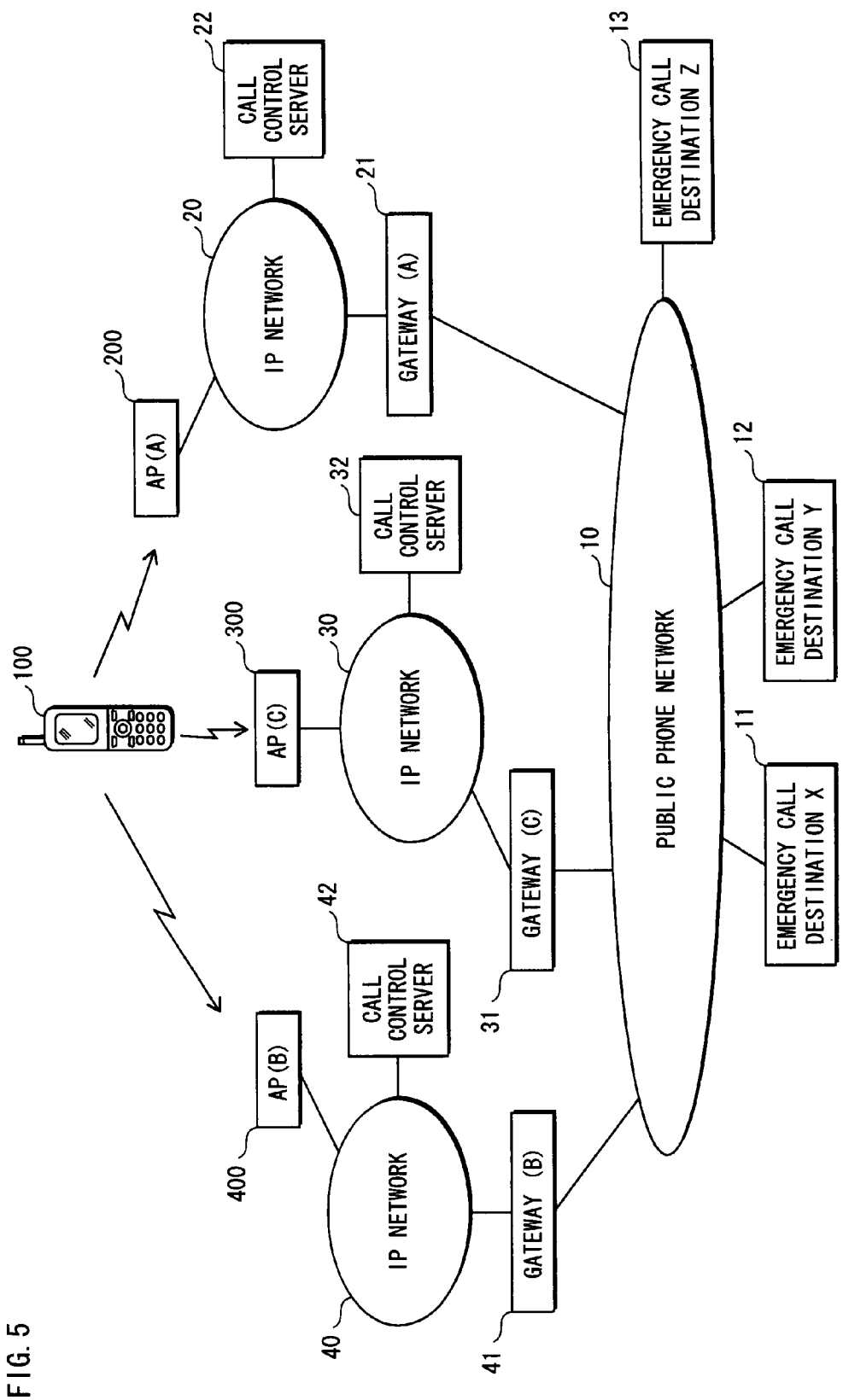
FIG. 5 shows an example of a communication network of the embodiment.

FIG. 5 shows an example of an IP communication network. In FIG. 5, a mobile phone 100 is the mobile phone of the embodiment, an IP network 40 is an IP network provided by a communication carrier to which a user having the mobile phone 100 contracts (hereinafter, referred to as a "contracted IP network"), and an AP (B) 400 is an access point for connecting to the IP network 40.

IP networks 20 and 30 are IP networks of communication carriers to which the user does not contract, and an AP (A) 200 and an AP (C) 300 are access points respectively connecting to the IP networks 20 and 30.

The IP networks 20, 30, and 40 respectively connect to call control servers 22, 32, and 42 for performing call setup and authentication in order to connect to the IP networks 20, 30, and 40, and have gateways (A) 21, (C) 31, and (B) 41 for connecting to a public phone network 10. The public phone network 10 is connected to phones of emergency call destinations 11, 12, and 13 such as a police station, a fire station, and the like via a switching device that is not illustrated.

The mobile phone 100 of this embodiment has a mobile phone function of connecting to the public phone network 10 via a base station that is not illustrated, and a VoIP communication function of connecting to the contracted IP network 40 via the contracted AP such as the AP (B) 400 that is connected to the contracted IP network 40.

In a communication system of the embodiment, when the mobile phone 100 receives a particular emergency number such as 911 from the user, the mobile phone 100 tries to connect to an emergency call destination indicated by the emergency number via the public phone network 10. If the mobile phone 100 cannot communicate with the base station due to a low reception strength and the like, the mobile phone 100 detects access points including the contracted AP and the non-contracted AP around the mobile phone 100 to select an access point having a high reception strength, and transmits a connection request indicating the emergency call to the access point.

Only when receiving the connection request indicating the emergency call from the mobile phone 100, each of the access points AP (A) 200, AP (C) 300, and AP (B) 400 permits the mobile phone 100 to connect to the corresponding IP network regardless of whether contracted or not, to establish a connection with the emergency call destination.

Note that in the embodiment, when receiving a normal connection request which is not an emergency call from the mobile phone 100, each of the access points AP (A) 200, AP (C) 300, and AP (B) 400 permits the mobile phone 100 to connect to the corresponding IP network only if the mobile phone 100 is contracted to the access point, according to a conventional communication system complying with an H.323 protocol. Also, each of the access points AP (A) 200, AP (C) 300, and AP (B) 400 uses a direct signaling method in which a call control message such as a call establishment request and the like is directly exchanged between the access point and the call destination phone, or between the access point and the gateway.

<Structure>

FIG. 1 shows a function structure of the mobile phone 100 and one access point shown in FIG. 5. Because each of the access points AP (A) 200, AP (C) 300, and AP (B) 400 shown in FIG. 5 has a same structure, only the AP (A) 200 will be described here.

<1. Mobile Phone 100>

The mobile phone 100 complies with the H.323 protocol, and includes an input receiving unit 110, a storing unit 120, a communicating unit 130, a voice processing unit 140, a wireless communicating unit 150, and a control unit 160.

The following describes each of the above-mentioned units.

(Input Receiving Unit 110)

The input receiving unit 110 includes a plurality of operation buttons such as numeric keys, and transmits a signal corresponding to a button pressed by the user to the control unit 160.

(Storing Unit 120)

The storing unit 120 is composed of a storage medium such as a hard disk and the like, and stores user data such as a call destination phone number and the like, emergency number information indicating a predetermined emergency phone number such as 911 and the like, and contracted AP information indicating a SSID, a MAC address and the like of an access point connected to a contracted IP network.

(Communicating Unit 130)

The communicating unit 130 connects to the public phone network 10 by communicating with the base station via an antenna 131, and transmits a voice signal outputted from the voice processing unit 140. Also, the communicating unit 130 receives a voice signal from the antenna 131, and transmits the voice signal to the voice processing unit 140.

(Voice Processing Unit 140)

The voice processing unit 140 demodulates the voice signal obtained by the communicating unit 130, and transmits the demodulated voice signal to the control unit 160. Then, the voice processing unit 140 converts the voice signal from the control unit 160 from digital to analog, and outputs the converted voice signal to a speaker 142. Also, the voice processing unit 140 converts a voice signal obtained from a microphone 141 from analog to digital, modulates the converted voice signal, and outputs the modulated voice signal to the communicating unit 130.

(Wireless Communicating Unit 150)

The wireless communicating unit 150 makes a wireless connection to the access point via an antenna 151, in compliance with a standard such as IEEE802.11 and the like.

Specifically, the wireless communicating unit 150 obtains beacon signals sent from the access points, and transmits the beacon signals to the control unit 160. Then, the wireless communicating unit 150 transmits a connection request to one of the access points specified by the control unit 160. When connecting to the IP network via the access point, the wireless communicating unit 150 receives a voice packet from the call destination, and transmit the voice packet to the control unit 160. Also, the wireless communicating unit 150 transmits a voice packet received from the control unit 160 to the call destination via the access point.

(Control Unit 160)

The control unit 160 includes a CPU and a memory (a ROM and a RAM), and controls each unit of the mobile phone 100. The control unit 160 includes a communication control unit 161, an AP selecting unit 162, a connection requesting unit 163, and a voice packet converting unit 164.

The communication control unit 161 selects any of the communicating unit 130 and the wireless communicating unit 150 and causes the selected unit to perform communication, according to a result of a communication switching operation by the user or whether a phone number inputted by the user is the number indicated by the emergency number information.

The AP selecting unit 162 specifies access points around a current location based on the beacon signals received by the wireless communicating unit 150, and detects electric field strengths of the received beacon signals. Also, the AP selecting unit 162 selects one of the access points according to an instruction from the connection requesting unit 163, and transmits information indicating the selected access point to the connection requesting unit 163.

The connection requesting unit 163 operates as follows according to whether the phone number received by the input receiving unit 110 is the emergency phone number. The connection requesting unit 163 causes the AP selecting unit 162 to select the access point having a high electric field strength or the access point registered in the contracted AP information, from the access points specified by the AP selecting unit 162. Then, the connection requesting unit 163 transmits a connection request including an emergency flag that specifies whether the connection request is an emergency connection request, to the selected access point.

Note that the connection request can be realized by adding the emergency flag to a main body of a management frame prescribed by the conventional IEEE802.11.

After transmitting the connection request, the connection requesting unit 163 causes the wireless communicating unit 150 to transmit the voice packet to start a conversation, according to whether an answer signal to the connection request is received from the access point within a predetermined time.

The voice packet converting unit 164 has a CODEC (CORDER/DECORDER) function of performing compression coding on the voice signal received from the voice processing unit 140, and expansion decoding on the voice packet received by the wireless communicating unit 150. Also, the voice packet converting unit 164 packetizes the coded voice signal using a RTP (Real-time Transport Protocol) and the like, transmits the voice packet to the wireless communicating unit 150, and transmits the decoded voice signal to the voice processing unit 140.

<2. AP (A) 200>

The AP (A) 200 is connected to the IP network 20, and includes a storing unit 210, a wireless communicating unit 220, an IP network communicating unit 230, and a control unit 240.

The following describes each of the above-mentioned units.

(Storing Unit 210)

The storing unit 210 is composed of a storage medium such as a hard disk and the like, and stores connection information corresponding to different connection destinations according to whether the connection request from the mobile phone 100 is the emergency connection request indicating the emergency call.

(Wireless Communicating Unit 220)

The wireless communicating unit 220 receives the connection request from the mobile phone 100 via an antenna 221, and transmits the connection request to the control unit 240.

Also, the wireless communicating unit 220 relays the connection between the mobile phone 100 and the IP network 20.

(IP Network Communicating Unit 230)

The IP network communicating unit 230 is a communication interface to the IP network 20, and makes a connection between the mobile phone 100 and the emergency call destination, or the call destination on the IP network. Also, the IP network communicating unit 230 transmits and receives a voice packet, a call control message, and the like.

(Control Unit 240)

The control unit 240 includes a CPU and a memory (a ROM and a RAM), and controls each unit of the AP (A) 200. Also, the control unit 240 judges whether the connection request obtained by the wireless communicating unit 220 is the emergency connection request.

If the connection request is an emergency connection request, the control unit 240 transmits an answer signal including an IP address of a connection destination based on the connection information, to the mobile phone 100. If the connection request is a normal connection request, the control unit 240 requests the call control server 22 to perform authentication of a request source and address resolution regarding the IP address of a call destination, and obtains a result of the authentication and the IP address of the call destination, from the call control server 22. If the request source is valid as the result of the authentication, the control unit 240 transmits an answer signal including the IP address of the call destination obtained from the call control server 22, to the request source.

Also, the control unit 240 transmits a call establishment request to an IP address of a call destination, and obtains an answer to the call establishment request from the call destination to establish a connection with the call destination.

Moreover, the control unit 240 receives a signal indicating a conversation end from the mobile phone 100 via the wireless communicating unit 220, and transmits a session-end message to the phone of the call destination or the gateway. Then, the control unit 240 receives the session-end message from the call destination or the gateway, and disconnects the connection between the mobile phone 100 and the call destination or the gateway.

<3. Call Control Server 22>

The call control server 22 is realized by an H.323 gatekeeper, and holds registration information for authenticating a contracted mobile phone which is permitted to connect to the IP network 20. Also, the call control server 22 authenticates whether a mobile phone of a connection request source is registered in the registration information. If the mobile phone is registered in the registration information, the call control server 22 converts a call destination phone number obtained from an access point into a corresponding IP address, and transmits the IP address and the authentication result indicating that the connection request source is valid, to the access point.

<4. Gateway (A) 21>

The gateway (A) 21 is an H.323 gateway for connecting the IP network 20 and the public phone network 10, and has functions of call control and connection deletion of both the access point connected to the IP network 20 and the phone connected to the public phone network 10.

<Data>

The following describes data used in the above-mentioned communication system.

FIG. 2A shows connection request data which is transmitted to an access point by the mobile phone 100 in case of an emergency call, and stored in a main body of a connection request management frame. The mobile phone 100 transmits the main body of the frame shown in FIG. 2A, a MAC header including information such as a MAC address of the access point, a MAC address of the mobile phone 100, and the like, and a FCS (Frame Check Sequence), to the access point.

Connection request data 500 includes an emergency flag 510, a SSID 520, a call destination phone number 530, and a specific phone number 540.

In the embodiment, when a user inputs an emergency number, "1" is stored in the emergency flag 510 in the connection request data 500 by the connection requesting unit 163. When the user inputs a phone number other than the emergency number, "0" is stored in the emergency flag 510. Also, by the connection requesting unit 163, a SSID of the selected access point is stored in the SSID 520, the phone number inputted by the user is stored in the call destination phone number 530, and an IP phone number set in the mobile phone 100 is stored in the specific phone number 540.

FIG. 2B shows a structure of a registration information table stored in the call control server 22.

A registration information table 600 stores a MAC address 610, an IP address 620, and a specific phone number 630 so as to correspond to each other.

The MAC address 610 is a MAC address of the contracted mobile phone which is permitted to connect to the IP network 20, and the IP address 620 is an IP address assigned to the contracted mobile phone in the IP network 20. The specific phone number 630 is an IP phone number of the contracted mobile phone in the IP network 20, such as an IP phone number beginning with "050" in Japan.

FIG. 2C shows a structure of a connection information table stored in the AP (A) 200.

A connection information table 700 stores an emergency flag 710 and a connection destination 720 so as to correspond to each other. The emergency flag 710 indicates an emergency flag of a connection request, and the connection destination 720 indicates a connection destination in the IP network 20 corresponding to a value of the emergency flag of the connection request.

In case of the communication network shown in FIG. 5, when the emergency flag 710 is "1", i.e. in case of an emergency call, the AP (A) 200 transmits a call establishment request to an IP address of the gateway (A) 21 which is connected to the public phone network 10, and connects to an emergency call destination via the gateway (A) 21.

When the emergency flag 710 is "0", i.e. in case of a normal call, the AP (A) 200 requests an IP address of the call control server 22 to perform authentication of a connection request source, and transmit an IP address of a call destination. If the connection request source is valid, the AP (A) 200 transmits a call establishment request to the call destination.

<Operation>

The following describes an operation of the above-mentioned communication system using the communication network shown in FIG. 5.

Figure 3:
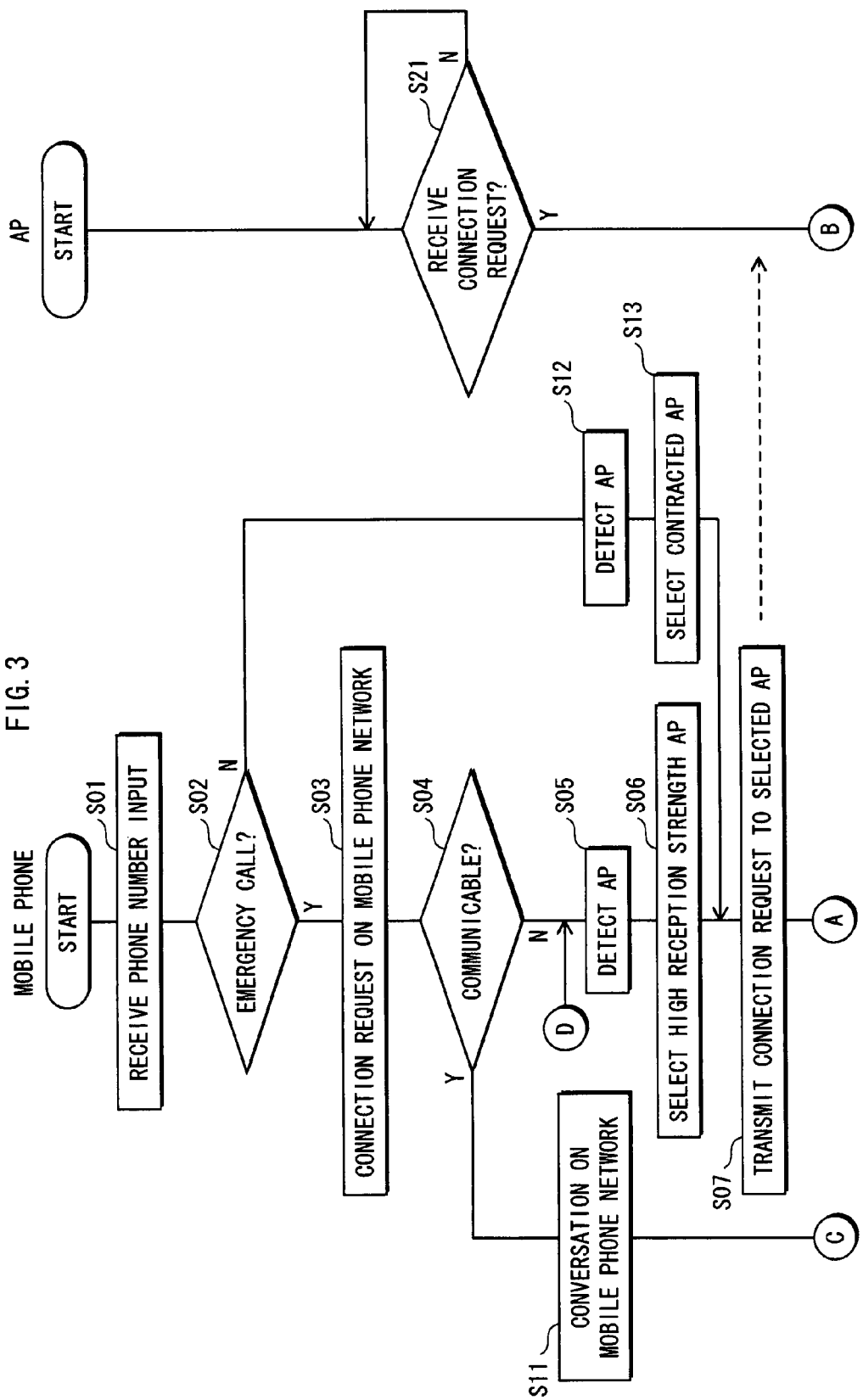
FIG. 3 is a flowchart showing operations of a mobile phone 100 and an access point.
Figure 4:
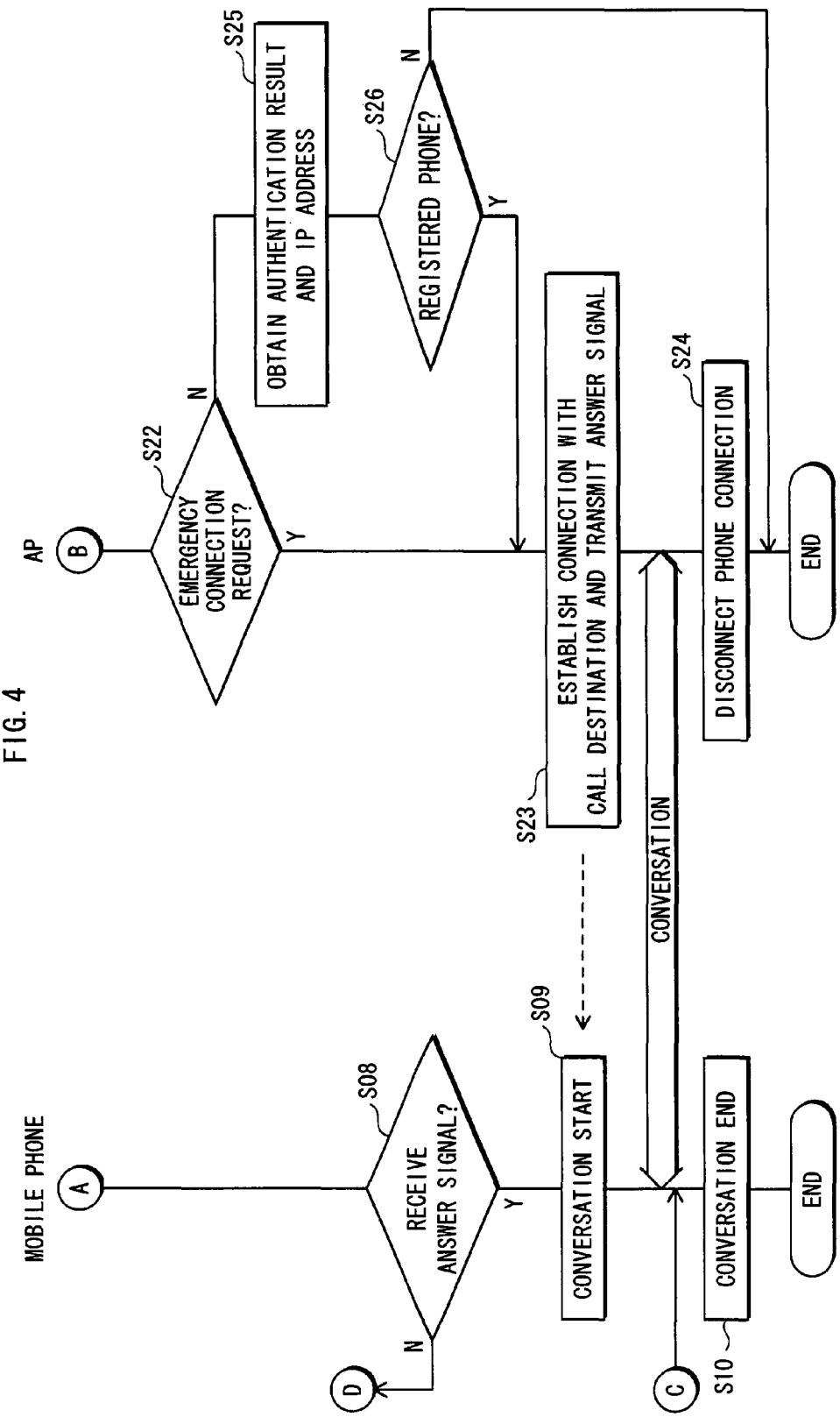
FIG. 4 is a flowchart showing the operations of the mobile phone 100 and the access point.

FIG. 3 and FIG. 4 are flowcharts showing operations of the mobile phone 100 and the access point of the embodiment. The operation of the communication system will be described according to FIG. 3 and FIG. 4.

Note that reception strengths of the access points AP (A) 200, the AP (C) 300, and the AP (B) 400 around the mobile phone 100 shown in FIG. 5 are larger, the AP (A) 200, the AP (C) 300, and the AP (B) 400, in this order.

In step S01 in FIG. 3, when receiving a phone number input from a user via the input receiving unit 110, the connection requesting unit 163 in the mobile phone 100 judges whether the received phone number is an emergency number indicated by emergency number information (step S02).

In step S02, if the received phone number is judged to be identical to the emergency number ("YES" in step S02), the communication control unit 161 activates the communicating unit 130, and requests the base station to connect to the received phone number via the communicating unit 130 (step S03).

Then, the communicating unit 130 judges whether a communication with the base station, which is requested the connection in step S03, can be performed (step S04). If the communicating unit 130 judges that the communication with the base station cannot be performed due to a low electric field strength of a radio wave from the base station, and the like ("NO" in step S04), the communication control unit 161 stops the access from the communicating unit 130 to the base station, and activates the wireless communicating unit 150.

The wireless communicating unit 150 receives beacon signals transmitted from the AP (A) 200, the AP (C) 300, and the AP (B) 400 in a predetermined cycle, and obtains the following information from the beacon signals to detect connectable access points. The information can specify an access point, such as a SSID, a MAC address, and the like of each of the access points. Then, the wireless communicating unit 150 transmits the information to the AP selecting unit 162 (step S05).

The AP selecting unit 162 selects the AP (A) 200 having the beacon signal with a high electric field strength, from the access points indicated by the information such as a SSID, a MAC address, and the like which is obtained in step S05 (step S06).

The connection requesting unit 163 transmits the following connection request data 500 to the AP (A) 200 which is selected in step S06 (step S07). The connection request data 500 includes the emergency flag 510 in which "1" is stored, and a MAC header and the like is added to the connection request data 500.

When the control unit 240 of the AP (A) 200 receives the connection request data 500 from the mobile phone 100 via the wireless communicating unit 220 ("YES" in step S21), the control unit 240 judges whether the connection request is an emergency connection request by referring to the emergency flag 510 in the connection request data 500 (step S22 in FIG. 4).

In FIG. 4, the control unit 240 of the AP (A) 200 judges that the connection request is the emergency connection request if the emergency flag 510 is "1" ("YES" in step S22), and transmits a call establishment request to the gateway (A) 21 corresponding to the emergency flag 710 "1" of the connection information table 700, via the IP network communicating unit 230. Then, the control unit 240 receives an answer signal to the call establishment request from the gateway (A) 21, via the IP network communicating unit 230 to establish a connection with a call destination, and transmits the answer signal including the IP, address of the gateway (A) 21 to the mobile phone 100, via the wireless communicating unit 220 (step S23).

When the connection requesting unit 163 of the mobile phone 100 receives the answer signal from the AP (A) 200, via the wireless communicating unit 150 ("YES" in step S08), transmits a voice packet via the wireless communicating unit 150 to start a conversation (step S09), and transmits a disconnect request of the phone connection to the AP (A) 200, when the user ends the conversation (step S10).

When receiving the disconnect request from the mobile phone 100, the AP (A) 200 transmits an end request indicating a session-end to the gateway (A) 21. Then, the AP (A) 200 receives the end request from the gateway (A) 21 to disconnect the connection (step S24).

In step S08 in FIG. 4, if the wireless communicating unit 150 does not receive the answer signal from the AP (A) 200 within a predetermined time ("NO" in step S08), the AP selecting unit 162 performs the processes following step S05 in FIG. 3, except for the AP (A) 200.

In step S02 in FIG. 3, the connection requesting unit 163 of the mobile phone 100 judges that the received phone number is not the emergency number if the emergency flag 510 is "0" ("NO" in step S02), and instructs the AP selecting unit 162 to select an access point indicated by contracted IP information. Then, the AP selecting unit 162 detects access points (step S12), and selects the AP (B) 400 registered in the contracted IP information, from the detected access points (step S13).

The connection requesting unit 163 transmits a connection request including the emergency flag 510 in which "0" is stored, to the AP (B) 400 selected in step S13 (step S07), and performs the processes following step S08.

In step S22 in FIG. 4, the control unit 240 of the AP (B) 400 judges that the connection request is not the emergency connection request, if the emergency flag 510 in the connection request data 500, which is received from the mobile phone 100 in step S07, is "0" ("NO" in step S22). Then, the control unit 240 transmits the MAC address and the specific phone number of the mobile phone 100, and a phone number of a call destination to the call control server 42 via the IP network communicating unit 230, and obtains an authentication result and an IP address of the call destination, from the call control server 42 (step S25).

If the authentication result in step S25 indicates that the connection request is from the registered phone ("YES" in step S26), the control unit 240 of the AP (B) 400 transmits a call establishment request to the IP address of the call destination to establish a connection. Then, the control unit 240 transmits an answer signal including the IP address of the call destination to the mobile phone 100, via the wireless communicating unit 220 (step S23), and performs the processes following step S24.

Note that if the authentication result obtained in step S25 indicates that the connection request is not from the registered phone ("NO" in step S26), the control unit 240 of the AP (B) 400 ends the process without transmitting the answer signal to the connection request.

<Modification>

Up to now, the communication system of the present invention has been described specifically through the embodiment. However, the technical scope of the present invention is not limited to the above-described embodiment. For example, the following are modifications.

(1) In the above-mentioned embodiment, the direct signaling method is used. However, signaling control may be performed via the call control server.

In this case, when the access point obtains the connection request from the mobile phone, the access point makes a registration request by transmitting a call control address of the mobile phone to the call control server, if the connection request is the emergency connection request. If the connection request is the normal connection request, the access point also makes an authentication request.

The call control server registers the call control address of the mobile phone, and transmits a registration answer signal to the access point. Note that if the call control server receives the authentication request, the call control server authenticates the mobile phone of the registration request same as the above-mentioned embodiment, and transmits the authentication result to the access point.

When the access point receives the registration answer signal, the access point transmits a call receive judge request message including the call destination phone number and the like to the call control server, if the connection request is the emergency connection request, or the access point obtains the authentication result indicating that the connection request is valid. Then, the call control server transmits a call receive judge confirmation message including the IP address of the call destination to the access point.

The access point transmits the call establishment request with the call destination to the call control server. Then, the call control server transmits the call establishment request to the call destination. The access point receives the call establishment confirmation to the call establishment request from the call destination via the call control server, and transmits the answer signal including the IP address of the call destination to the mobile phone.

When the mobile phone receives the answer signal, the mobile phone establishes a session with the IP address of the call destination to start a conversation.

(2) Also, in the above-mentioned embodiment, the communication system complying with the H.323 protocol is described. However, a communication system using a SIP (Session Initiation Protocol) and a communication system using a MGCP (Media Gateway Control Protocol) and H.248/MEGACO (MEDIA GATEWAY CONTROL) and the like may be used.

As an example, an emergency call using the SIP will be described.

In this case, the mobile phone and the call control server correspond to the SIP. When the mobile phone makes the connection request to the access point, the access point transmits the answer signal to the mobile phone if the connection request is the emergency connection request, and receives an INVITE message from the mobile phone, in order to establish the connection with the emergency call destination via the gateway.

The access point transmits the received INVITE message to the SIP server, and the SIP server transmits the INVITE message to the gateway. Then, the gateway establishes the connection to the emergency call destination.

After that, the access point receives an OK message transmitted from the gateway via the SIP server, and transmits the OK message to the mobile phone. Then, the access point receives an ack message transmitted from the mobile phone, and transmits the ack message to the SIP server. The SIP server transmits the ack message to the gateway, and a conversation between the mobile phone and the call destination starts.

(3) Moreover, in the above-mentioned embodiment, the call control server authenticates the mobile phone of the connection request source. However, the access point may authenticate the mobile phone of the connection request source by holding authentication information.

(4) Furthermore, in the above-mentioned embodiment, only one gateway is placed on a contact point between the IP network and the public phone network. However, a plurality of gateways may be placed per area. In this case, each of the access points stores IP addresses of gateways around an area in which the access point is placed. When the access point receives the emergency connection request, the access point selects the stored IP addresses of the gateways, and transmits an answer signal including the IP addresses to the request source.

Note that in this case, the mobile phone transmits the following connection request to the access point. The connection request includes information which can specify a location of the user making the emergency call, such as location information of the connection request source obtained from a GPS which is mounted on the mobile phone. Then, the access point may select the gateway placed in the area corresponding to the location information included in the connection request.

(5) Also, in the above-mentioned embodiment, the communication network in which the IP network of each of the communication carriers is connected to the public phone network is described. However, a communication network in which the IP network of each of the communication carriers is connected to the Internet and the public phone network may also be applied.

(6) Moreover, in the above-mentioned embodiment, the mobile phone specifies the access point by obtaining the beacon signal from the access point. However, the mobile phone may specify the access point by broadcasting a probe request and obtaining an answer signal to the probe request.

(7) Furthermore, in the above-mentioned embodiment, after the access point receives the connection request, the access point transmits the call establishment request to the connection destination to establish the connection with the call destination. However, the mobile phone may make the call establishment request to the call destination. In this case, after the mobile phone receives the answer signal including the IP address of the call destination to the connection request from the access point, the mobile phone transmits the call establishment request to the IP address of the call destination via the access point. Then, the mobile phone receives the answer signal to the call establishment request from the call destination via the access point, and establishes a session with the call destination to start a conversation.

(8) Also, a program for causing a processor to perform each of the processes in the mobile phone (FIG. 3 and FIG. 4) may be circulated and distributed, by recording the program on a storage medium, or via various communication paths. The storage medium includes an IC card, a hard disk, an optical disk, a flexible disk, a ROM, and the like. The circulated and distributed program is used by being stored in a memory and the like which can be read by the processor, and the function of the mobile phone described in the above-mentioned embodiment can be realized by executing the program by the processor.

(9) Moreover, in the above-mentioned embodiment, the present invention is described using the mobile phone. However, a mobile information terminal having a wireless communication function such as a PDA (Personal Digital Assistant) and the like may also be used.

(10) Furthermore, an object of the communication system in the above-mentioned embodiment is to provide a communication system in which an emergency call can be made by the VoIP communication in an emergency, and including an access point and a mobile phone, the access point authenticating, in response to a connection request from the mobile phone, the mobile phone based on registration information indicating each mobile phone connectable to a VoIP network, and establishing a connection to the VoIP network if the mobile phone is authenticated as authorized, the mobile phone comprising: a number receiving unit operable to receive an input of a phone number; a judging unit operable to judge whether the received phone number is a predetermined emergency number; and a connection requesting unit operable to, if the received phone number is judged to be the predetermined emergency number, select one access point from one or more access points, and send an emergency connection request indicating an emergency call to the selected access point, the one or more access points each being recognized as a connection target by the mobile phone, and each of the one or more access points comprising: a connection request receiving unit operable to receive the connection request from the mobile phone; and a connecting unit operable to, if the connection request received by the connection request receiving unit is the emergency connection request, establish the connection to the VoIP network without performing the authentication.

Here, the one or more access points recognized by the mobile phone indicate the access points from which the mobile phone can obtain information specifying the access points, such as a SSID (Service Set Identifier) and an ESSID (Extended Service Set Identifier) of the access points, by receiving a beacon signal and a probe answer signal and the like from the access points.

Also, establishing the connection between the mobile phone and the emergency call destination is establishing the connection from the access point to a gateway which is a contact point between a phone network, to which the emergency call destination is connected, and the IP network.

With the above-stated construction, in the communication system in the above-mentioned embodiment, when it is difficult for the mobile phone to make an emergency call on a mobile phone network, the mobile phone transmits the connection request indicating the emergency call, to one of the access points located around the mobile phone. If the connection request is the emergency connection request, the access point can establish the connection between the mobile phone and the emergency call destination, regardless of whether the mobile phone has a valid authority to use the IP network. Therefore, even if an access point of a communication carrier to which a user having the mobile phone contracts is not located around the mobile phone in an emergency, or if it is difficult to perform an IP communication due to a low radio field strength, the user can make the emergency call via an access point of another communication carrier.

(11) Moreover, the mobile phone in the above-mentioned embodiment selects an access point having a higher electric field strength of a radio wave from the detected access points, when the received phone number is the predetermined emergency number. With the above-stated construction, the user can transmit the connection request to the access point having a high electric field strength of a reception radio wave, out of the access points located around the mobile phone in an emergency. Therefore, a problem that a conversation in an emergency is interrupted and the like can be prevented as much as possible.

(12) Furthermore, the mobile phone in the above-mentioned embodiment is connectable to a phone network via a base station, and tries to connect to the base station, and selects the access point if unable to connect to the base station. With the above-stated construction, if the mobile phone cannot connect to the base station of the communication carrier to which the user contracts in an emergency, the mobile phone can connect to the VoIP network. As a result, firstly, the user can directly make the emergency call to the emergency call facility such as a police station, a fire station, and the like around the user in an emergency via the mobile phone network. Thus, the user can put a high priority on immediacy in an emergency, and immediately make the emergency call on the spot without moving to another location.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A communication system including an access point and a mobile wireless communication device, the access point authenticating, in response to a connection request from the mobile wireless communication device, the mobile wireless communication device based on registration information indicating each mobile wireless communication device connectable to a VoIP network, and establishing a connection to the VoIP network if the mobile wireless communication device is authenticated as authorized, the mobile wireless communication device comprising:
a number receiving unit operable to receive an input of a phone number;
a judging unit operable to judge whether the received phone number is a predetermined emergency number; and
a connection requesting unit operable to, if the received phone number is judged to be the predetermined emergency number, select one access point from one or more access points, and send an emergency connection request indicating an emergency call to the selected access point, the one or more access points each being recognized as a connection target by the mobile wireless communication device, and each of the one or more access points comprising:
a connection request receiving unit operable to receive the connection request from the mobile wireless communication device; and
a connecting unit operable to, if the connection request received by the connection request receiving unit is the emergency connection request, establish the connection to the VoIP network without performing the authentication, wherein the mobile wireless communication device is both connectable to the VoIP network via the access point and to a phone network via one or more base stations, and
the connection requesting unit first tries to connect to the phone network via at least one of the one or more base stations before trying to connect to the VoIP network via the access point, and selects the access point if unable to connect to at least one of the one or more base stations.

2. An access point for authenticating, in response to a connection request from a mobile wireless communication device, the mobile wireless communication device based on registration information indicating each mobile wireless communication device connectable to a VoIP network, and establishing a connection to the VoIP network if the mobile wireless communication device is authenticated as authorized, the access point comprising:
a connection request receiving unit operable to receive the connection request including a call destination phone number and information which indicates whether an emergency call is requested, from the mobile wireless communication device; and
a connecting unit operable to, if the information in the connection request indicates that the emergency call is requested establish the connection to the VoIP network without performing the authentication, wherein
the mobile wireless communication device is both connectable to the VoIP network via the access point and to a phone network via one or more base stations, and
the mobile wireless communication device first tries to connect to the phone network via at least one of the one or more base stations before trying to connect to the VoIP network via the access point, and selects the access point if unable to connect to at least one of the one or more base stations.

3. A mobile wireless communication device for connecting to a VoIP network via an access point to perform communication, the mobile wireless communication device comprising:
a number receiving unit operable to receive an input of a phone number;
a judging unit operable to judge whether the received phone number is a predetermined emergency number;
a selecting unit operable to, if the received phone number is judged to be the predetermined emergency number, detect one or more connectable access points, and select one access point from the detected access points; and
a connection requesting unit operable to send an emergency connection request indicating an emergency call to the selected access point, wherein
the mobile wireless communication device is both connectable to the VoIP network via the access point and to a phone network via one or more base stations, and
the connection requesting unit first tries to connect to the phone network via at least one of the one or more base stations before trying to connect to the VoIP network via the access point, and selects the access point if unable to connect to at least one of the one or more base stations.

4. The mobile wireless communication device of claim 3, wherein
the selecting unit selects an access point having a higher electric field strength of a radio wave from the detected access points.

5. A mobile wireless communication device, comprising:
a communicating unit operable to connect to a VoIP network via an access point; and
a connection requesting unit operable to, if the mobile wireless communication device receives an input of a predetermined number, send a connection request indicating an emergency call to one connectable access point via the communicating unit, wherein
the mobile wireless communication device is both connectable to the VoIP network via the access point and to a phone network via one or more base stations, and
the connection requesting unit first tries to connect to the phone network via at least one of the one or more base stations before trying to connect to the VoIP network via the access point, and selects the access point if unable to connect to at least one of the one or more base stations.

6. A computer-readable medium storing computer-executable instructions thereon that, when executed by a mobile wireless communication device for executing a program, perform a process of storing a predetermined emergency number, receiving an input of a phone number, and performing communication with a call destination indicated by the received phone number by connecting to a VoIP network via an access point, the process comprising:
a judging step of judging whether the received phone number is the predetermined emergency number;
a selecting step of detecting one or more connectable access points, and selecting one access point from the detected access points, if the received phone number is judged to be the predetermined emergency number; and
a connection requesting step of sending an emergency connection request indicating an emergency call to the selected access point, wherein
the mobile wireless communication device is both connectable to the VoIP network via the access point and to a phone network via one or more base stations, and the connection requesting step further comprises a base station connection step of first trying to connect to the phone network via at least one of the one or more base stations before trying to connect to the VoIP network via the access point, and selecting the access point if unable to connect to at least one of the one or more base stations.

* * * * *